United States Patent
van Zwol et al.

(10) Patent No.: US 8,370,286 B2
(45) Date of Patent: Feb. 5, 2013

(54) SYSTEM FOR PERSONALIZED TERM EXPANSION AND RECOMMENDATION

(75) Inventors: Roelof van Zwol, Badalona (ES); Borkur Sigurbjornsson, Barcelona (ES); Adam Rae, Barcelona (ES)

(73) Assignee: Yahoo! Inc., Sunnyvale, CA (US)

( * ) Notice: Subject to any disclaimer, the term of this patent is extended or adjusted under 35 U.S.C. 154(b) by 648 days.

(21) Appl. No.: 12/537,157

(22) Filed: Aug. 6, 2009

(65) Prior Publication Data

US 2011/0035350 A1    Feb. 10, 2011

(51) Int. Cl.
| | |
|---|---|
| G06F 17/00 | (2006.01) |
| G06N 5/02 | (2006.01) |
| G06F 9/44 | (2006.01) |
| G06N 7/02 | (2006.01) |
| G06N 7/06 | (2006.01) |
| G06N 7/04 | (2006.01) |

(52) U.S. Cl. ................ 706/52; 706/46; 706/54
(58) Field of Classification Search .............. None
See application file for complete search history.

(56) References Cited

U.S. PATENT DOCUMENTS

| | | | |
|---|---|---|---|
| 6,223,183 B1 | 4/2001 | Smith et al. | |
| 6,882,970 B1 | 4/2005 | Garner et al. | |
| 7,685,198 B2 * | 3/2010 | Xu et al. | 707/748 |
| 7,788,247 B2 * | 8/2010 | Wang et al. | 707/705 |
| 2003/0061028 A1 | 3/2003 | Dey et al. | |
| 2004/0080726 A1 | 4/2004 | Suh | |
| 2005/0004930 A1 | 1/2005 | Hatta | |
| 2005/0209989 A1 | 9/2005 | Albornoz et al. | |
| 2008/0010226 A1 | 1/2008 | Brinker | |
| 2008/0025617 A1 | 1/2008 | Posse et al. | |

(Continued)

OTHER PUBLICATIONS

Sood, Sanjay C.; Owsley, Sara H.; Hammond, Kristian J.; Birnbaum, Larry. "TagAssist: Automatic Tag Suggestion for Blog Posts." ICWSM 2007 Boulder, CO.*

(Continued)

*Primary Examiner* — Kakali Chaki
*Assistant Examiner* — Daniel Pellett
(74) *Attorney, Agent, or Firm* — Weaver Austin Villeneuve & Sampson LLP (57) ABSTRACT

Disclosed are methods and apparatus for providing a set of recommended annotations. A set of tags associated with a content item within a content sharing system is identified, where the content item is associated with a user of the content sharing system. A set of global tag co-occurrences within the content sharing system is identified for the set of tags, where each of the global tag co-occurrences in the set of global tag co-occurrences identifies a pair of tags including one of the set of tags, wherein the pair of tags have both been used together to tag at least one of the content items within the content sharing system. One or more sets of personal tag co-occurrences is identified for the set of tags, where each of the sets of personal tag co-occurrences is used in a corresponding one of one or more personal contexts of the content sharing system, the one or more personal contexts relating to the user of the content sharing system. Each of the personal tag co-occurrences in the sets of personal tag co-occurrences identifies a pair of tags including one of the set of tags that have both been used together to tag at least one content item within a corresponding one of the one or more personal contexts. A set of recommended tags is generated from the set of global tag co-occurrences and the one or more sets of personal tag co-occurrences.

26 Claims, 9 Drawing Sheets

U.S. PATENT DOCUMENTS

| | | | |
|---|---|---|---|
| 2008/0201302 | A1 | 8/2008 | Kimchi |
| 2009/0094189 | A1* | 4/2009 | Stephens .......................... 707/2 |
| 2009/0254540 | A1* | 10/2009 | Musgrove et al. ................ 707/5 |
| 2010/0228691 | A1* | 9/2010 | Yang et al. ...................... 706/12 |
| 2010/0332478 | A1* | 12/2010 | Duman et al. ................ 707/738 |

OTHER PUBLICATIONS

Paul-Alexandru Chirita, Stefania Costache, Wolfgang Nejdl, and Siegfried Handschuh. 2007. P-TAG: large scale automatic generation of personalized annotation tags for the web. In Proceedings of the 16th international conference on World Wide Web (WWW '07). ACM, New York, NY, USA, 845-854.*

Borkur Sigurbjornsson and Roelof van Zwol, "Extending Media Annotations Using Collective Knowledge," U.S. Appl. No. 12/057,587, filed Mar. 28, 2008; 26 pgs.

Nikhil Garg and Ingmar Weber, "Personalized, Interactive Tag Recommendation for Flickr," In Proceeding of the 2008 ACM Conference on Recommender Systems, pp. 67-74, Lausanne, Switzerland, Oct. 23-25, 2008.

Jaschke et al, "Tag Recommendations in Folksonomies," In Proceedings of the 11$^{th}$ European conference on Principles and Practice of Knowledge Discovery in Databases, vol. 4702, pp. 506-514, 2007.

Kern et al., "Extending Folksonomies for Image Tagging," Ninth International Workshop on Image Analysis for Multimedia Interactive Services, May 2008, pp. 126-129.

Lindstaedt et al., "Recommending Tags for Pictures Based on Text, Visual Content and User Context," In ICIW '08: Proceeding of the 2008 Third International Conference on Internet and Web Applications and Services, 6 pgs.

P. Schmitz, "Inducing Ontology from Flickr Tags," In Proceeding of the Collaborative Web Tagging Workshop (WWW'06), May 22-26, 2006, Edinburgh, UK; 4 pgs.

B. Sigurbjornsson and R. van Zwol, "Flickr Tag Recommendation Based on Collective Knowledge," In Proceeding of the 17$^{th}$ International Conference on World Wide Web (WWW'08); Apr. 25-25, 2008, Beijing, China. ACM, pp. 327-336.

M. Van Erp and L. Schomaker, "Variants of the Borda Count Method for Combining Ranked Classifier Hypotheses," Proceedings of the 7$^{th}$ International Workshop on Frontiers in Handwriting Recognition, Sep. 11-13, 2000, Amsterdam, pp. 443-452.

Yue et al., "A Support Vector Method for Optimizing Average Precision," SIGIR '07, Jul. 23-27, 2007, Amsterdam, The Netherlands, 2007. ACM, pp. 271-278.

* cited by examiner

SYSTEM FOR PERSONALIZED TERM EXPANSION AND RECOMMENDATION

BACKGROUND

The disclosure relates generally to computer implemented and automatic recommendation of terms (e.g., annotations) within a content sharing system.

The global and open nature of the Internet has aided the rapid growth of multimedia sharing systems. Some examples of such multimedia sharing systems including content sharing websites such as FLICKR® and YOUTUBE®. One of the basic functionalities of content sharing websites is to provide a user with the ability to annotate or "tag" content items with textual descriptions of the submitted media such as photos and videos. For example, a user may tag a picture of the Eiffel Tower with the annotations "Eiffel Tower," "Paris" and "France."

The use of annotations (i.e., tags) in content sharing sites allows users to search for a given content item using well known text searching techniques and algorithms. Additionally, they allow content items to be treated as textual data in a variety of useful ways, such as categorizing content items, linking associated content items to a given content item, etc. Unfortunately, not all users put as much effort into annotating their media accurately.

SUMMARY OF THE INVENTION

Methods and apparatus for automatically generating recommended terms based upon an initial set of terms are disclosed. The initial set of terms may be annotations or query terms. Similarly, the recommended terms may be annotations or query terms.

In accordance with one embodiment, a set of terms within a content sharing system is identified, wherein the set of terms is associated with a user of the content sharing system, the content sharing system including a plurality of content items. For each of two or more contexts within the content sharing system, a set of annotation co-occurrences is identified for the set of terms, each of the set of annotation co-occurrences identifying a pair of annotations including one of the set of terms, wherein the pair of annotations have both been used together to annotate at least one of the plurality of content items within the corresponding one of the two or more contexts within the content sharing system, at least one of the two or more contexts being a personal context relating to the user of the content sharing system. A set of recommended terms is generated from the set of annotation co-occurrences identified for each of the two or more contexts.

In accordance with one embodiment, the set of terms may include a set of annotations associated with at least one content item within the content sharing system. The set of recommended terms may therefore be recommended annotations for use in annotating the content item. In accordance with another embodiment, the set of terms may be input terms of a query submitted by a user to the content sharing system. Thus, the set of recommended terms may be suggested query terms that may be provided to the user for use in composing and submitting an additional query to the content sharing system.

In accordance with one embodiment, the two or more contexts may include a variety of contexts. For example, the two or more contexts may include a global context pertaining to all content items within the content sharing system. As another example, the two or more contexts may include one or more personal contexts pertaining to a user of the content sharing system.

In accordance with another embodiment, a set of annotations associated with a content item within a content sharing system is identified, where the content item is associated with a user of the content sharing system. A set of global annotation co-occurrences within the content sharing system is identified for the set of annotations, where each of the global annotation co-occurrences in the set of global annotation co-occurrences identifies a pair of annotations including one of the set of annotations, wherein the pair of annotations have both been used together to annotate at least one of the content items within the content sharing system. One or more sets of personal annotation co-occurrences is identified for the set of annotations, where each of the sets of personal annotation co-occurrences is used in a corresponding one of one or more personal contexts of the content sharing system, the one or more personal contexts relating to the user of the content sharing system. Each of the personal annotation co-occurrences in the sets of personal annotation co-occurrences identifies a pair of annotations including one of the set of annotations that have both been used together to annotate at least one content item within a corresponding one of the one or more personal contexts. A set of recommended annotations is generated from the set of global annotation co-occurrences and the one or more sets of personal annotation co-occurrences.

In accordance with another embodiment, a frequency of each pair of annotations co-occurring in the content sharing system is ascertained for each of the global annotation co-occurrences in the set of global annotation co-occurrences. In addition, for each of the personal annotation co-occurrences in the sets of personal annotation co-occurrences, a frequency of the pair of annotations co-occurring in the corresponding one of the personal contexts is ascertained. The set of recommended annotations may then be generated from the set of global annotation co-occurrences and the one or more sets of personal annotation co-occurrences using the frequency of each corresponding pair of annotations co-occurring.

In accordance with another embodiment, a ranked list of recommended annotations is generated for the set of global annotation co-occurrences and a ranked list of recommended annotations is generated for each of the sets of personal annotation co-occurrences. Ranking of each list may be performed using the frequency of each of the annotation co-occurrences occurring within the corresponding context. The ranked list of recommended annotations for the set of global annotation co-occurrences and the ranked list of recommended annotations for each of the sets of personal annotation co-occurrences are then aggregated such that a single ranked list of recommended annotations is generated.

In accordance with another embodiment, a set of annotations associated with a content item within a content sharing system is obtained, the content item being associated with a user of the content sharing system. For each of two or more personal contexts of the content sharing system, one or more personal annotation co-occurrences used in the one of the two or more personal contexts of the content sharing system are identified for each one of the set of annotations, the two or more personal contexts relating to the user of the content sharing system. Each of the personal annotation co-occurrences identifies a pair of annotations including one of the set of annotations that have both been used together to annotate at least one content item within the corresponding one of the two or more personal contexts, thereby generating a set of personal annotation co-occurrences for each of the two or more personal contexts such that two or more sets of personal annotation co-occurrences are generated. A set of recommended annotations is then generated from the two or more sets of personal annotation co-occurrences and corresponding co-occurrence counts for each pair of annotations in the two or more sets of personal annotation co-occurrences.

In another embodiment, the invention pertains to a device comprising a processor, memory, and a display. The processor and memory are configured to perform one or more of the above described method operations. In another embodiment, the invention pertains to a computer readable storage medium having computer program instructions stored thereon that are arranged to perform one or more of the above described method operations.

These and other features and advantages of the present invention will be presented in more detail in the following specification of the invention and the accompanying figures which illustrate by way of example the principles of the invention.

DESCRIPTION OF EXAMPLE EMBODIMENTS

Reference will now be made in detail to specific embodiments of the invention. Examples of these embodiments are illustrated in the accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The disclosed embodiments enable a set of recommended annotations based upon an initial set of annotations (e.g., associated with a content item) to be automatically generated. One or more annotations from the set of recommended annotations may be automatically added as annotations to the content item. Alternatively, the set of recommended annotations may be provided to the user to allow the user to add annotations from the set of recommended annotations to the content item. In this manner, the system may allow a user to fully describe his or her content items with terms he or she may not have originally considered. Moreover, as annotations describing content items are more thoroughly defined, users may locate and browse content items more effectively.

A content item may be a media item such as a photo, video, or audio. However, it is important to note that a content item need not be a media item. For instance, the content item may be a paper, book, or other document. A content sharing system may be any system that enables content items to be shared among users of the system.

Figure 1:
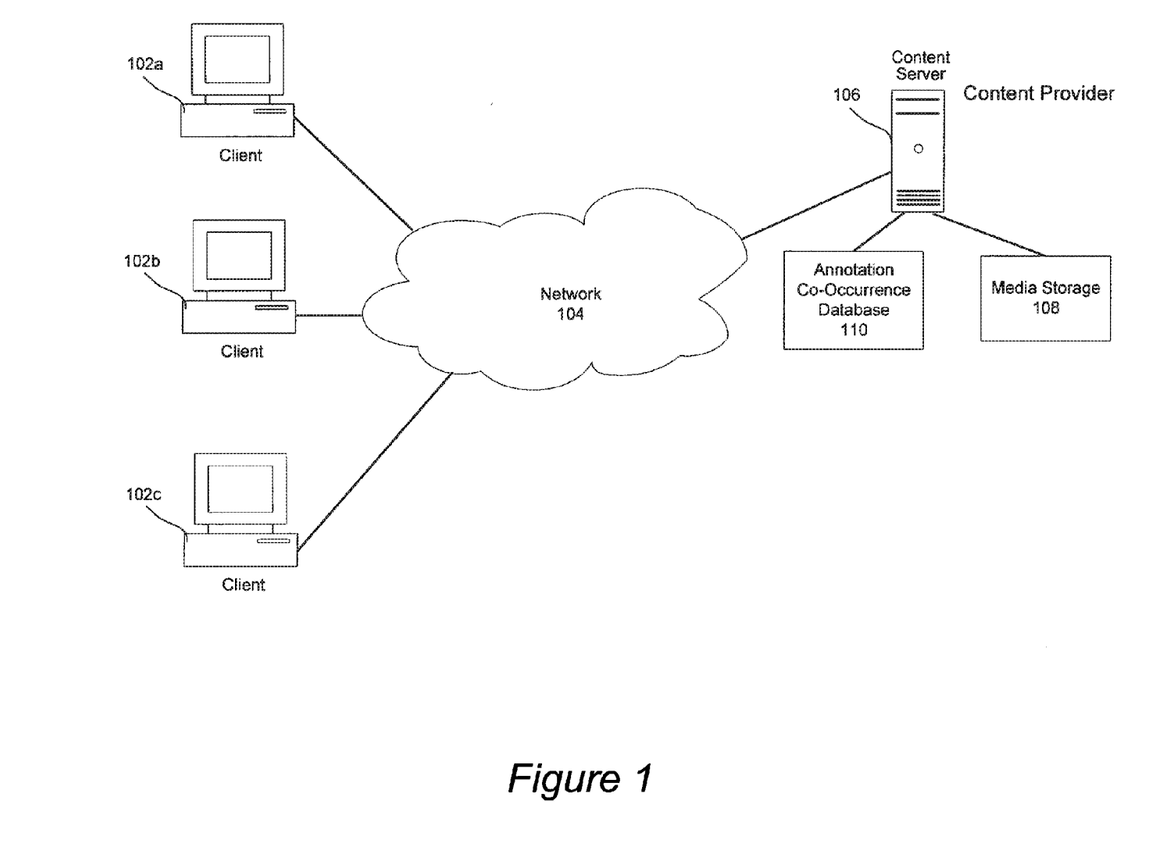
FIG. 1 is a block diagram illustrating an example system in which various embodiments may be implemented.

FIG. 1 is a block diagram illustrating an example system in which various embodiments may be implemented. A plurality of client devices 102a, 102b, 102c are communicatively coupled to a network 104, which may include a connection to one or more local or wide area networks, such as the Internet. Any of the client devices 102a, 102b, 102c may be in communication over the network 104 with a content provider via a content server 106. The network 104 may include any suitable number and type of devices, e.g., routers and switches, for support communication between each of the clients 102a, 102b, 102c and the content server 106. Although a single content server is shown in FIG. 1, it is important to note that any number of servers or devices may be used to implement the disclosed embodiments.

A user of any of the client devices 102a, 102b, 102c may upload a content item via the content server 106 to be stored by the content server 106 to media storage 108. In addition, the user may also add annotations (i.e., tags) to the content item stored in the media storage 108. Of course, the user may also remove or modify annotations from an existing content item. Verification of the identity of the user submitting or modifying the annotations for a content item may be performed via a login to the content provider via the content server 106. Accordingly, the media storage 108 may store a plurality of content items, as well as annotations associated with those content items. More specifically any one of the plurality of content items may have one or more annotations associated therewith. For example, a stored image of the Eiffel Tower may be associated with the annotations "Paris" and "Eiffel Tower." The media storage 108 may store a variety of content items in a variety of formats. In one embodiment, the media storage 108 may comprise a relational database. In other embodiments, other databases, flat files or alternative storage mechanisms may be used.

A user may also submit a search request via any of the client devices 102a, 102b, 102c. Specifically, a search query may be submitted via the content server 106. The content server 106 may then search the annotations of content items stored in the media storage 108 based upon the search query. The content server 106 may then provide a list of content items satisfying the search query to the requesting client device.

In one embodiment, the content server 106 may collect annotation data associated with content items as they are uploaded or updated. For instance, the content server 106 may maintain an occurrence count for each unique tag indicating the number of times the unique tag occurs across a plurality of content items. In addition, the content server 106 may also maintain a co-occurrence count for each unique annotation co-occurrence identifying a pair of annotations indicating the number of times the pair of annotations occurs across the plurality of content items. The plurality of content items may be identified as being associated with a particular context. Thus, annotation data may be collected for a variety of contexts, as will be described in further detail below.

The annotation data that is collected by the content server 106 may be stored in an annotation co-occurrence database 110, and updated as content items and/or annotations are added, modified, or deleted. The annotation co-occurrence database 110 may store annotation data across a plurality of content items. Specifically, the annotation co-occurrence database 110 may store annotation data for one or more separate contexts. The annotation data that is stored in the annotation co-occurrence database may include data regarding each unique annotation used within a particular context and each unique annotation pair used within the context. Specifically, the annotation data may include an occurrence count for each unique annotation used in the context and/or a co-occurrence count (e.g, frequency) for each unique pair of annotations used in the context. Thus, the co-occurrence database may store an annotation pair and an associated co-occurrence count indicating a frequency with which the annotation pair occurs. The annotation data stored in the co-occurrence database 110 may further include additional statistical information regarding content items and co-occurrence frequency of pairs of content items, as will be described in further detail below. The co-occurrence database 110 may comprise a relational database, file or other suitable data structures.

In accordance with various embodiments, the content server 106 may generate a set of "recommended annotations" based upon an initial set of annotations. This initial set of annotations may comprise user-submitted annotations. For instance, the content server 106 may obtain a set of annotations associated with a particular content item. The content server 106 may then access the media storage 108 and/or co-occurrence database 110 to generate a set of recommended annotations. The set of recommended annotations may be ranked, as will be described in further detail below. The content server 106 may then provide the set of recommended annotations to a user to enable the user to annotate the content item with one or more of the set of recommended annotations. In one embodiment, the content server 106 may provide the set of recommended annotations as a list of selectable annotations presented via a graphical user interface. Alternatively, the content server 106 may automatically annotate the content item with one or more of the set of recommended annotations.

In one embodiment, a set of recommended annotations may be generated from annotation data obtained from a single context based upon an initial set of annotations. In other embodiments, a set of recommended annotations may be generated from annotation data obtained from two or more contexts based upon an initial set of annotations. A set of example annotation contexts will be described below.

Annotation Contexts

A global context, or collective context, includes annotations associated with all media items within the media sharing system. The collective context therefore represents the collective annotation usage of all users of the content sharing system. In other words, the collective context is not user specific. Thus, a set of global annotation co-occurrences within the collective context may include annotation co-occurrences (i.e, pairs) that have been used to annotate (i.e, tag) content items of all users of the content sharing system. Each of the annotation pairs in the collective context has been used together to annotate at least one media item of at least one of the users of the content sharing system. The collective context may be useful when the user is not very active in the content sharing system (e.g., has few contacts or is not a member of many groups), which would restrict the capacity of other more personal contexts to provide relevant annotations.

Another set of contexts may be referred to as personal contexts that relate to a particular user of the content sharing system. Three different examples of personal contexts will be set forth below.

A first personal context may be referred to as an individual context. The individual context may include annotations associated with all content items that the user has uploaded to the media sharing system. Thus, a set of personal annotation co-occurrences in the individual context may include pairs of annotations, where each pair of annotations has been used together to annotate (i.e, tag) at least one content item of the user.

A second personal context may be referred to as a social contacts context. In some content sharing systems, a user can explicitly connect themselves to other users by designating them as a "contact." The social contacts context may include annotations associated with content items of users identified as "contacts" of the user. Thus, a set of personal annotation co-occurrences in the social contacts context may identify pairs of annotations, where each pair of annotations has been used together to annotate at least one content item of one of the contacts of the user. The social contacts context may not include annotations associated with content items of the user. In this manner, the social contacts context captures the vocabulary of the user's social contacts, possibly sharing attributes such as language, geographical proximity and/or content item interests.

A third personal context may be referred to as a social group context. In some content sharing systems, users can interact with each other through groups of which users can become members and share content items. Therefore, content items associated with such groups and the annotations annotating these content items may have a common theme (e.g., topic of the group). The social group context may include annotations of content items associated with one or more of the groups of which the user is a member. Thus, a set of personal annotation co-occurrences in the social group context may identify pairs of annotations, where each pair of annotations has been used together to annotate at least one content item of one of the groups of which the user is a member. The social contacts contact may not include annotations associated with content items of the user. In this manner, the social group context may capture the interests of the user.

Generating Recommended Annotations

Annotations may be recommended based upon annotation data obtained from a single context. Alternatively, annotations may be recommended based upon annotation data collected over two or more contexts.

Figure 2:
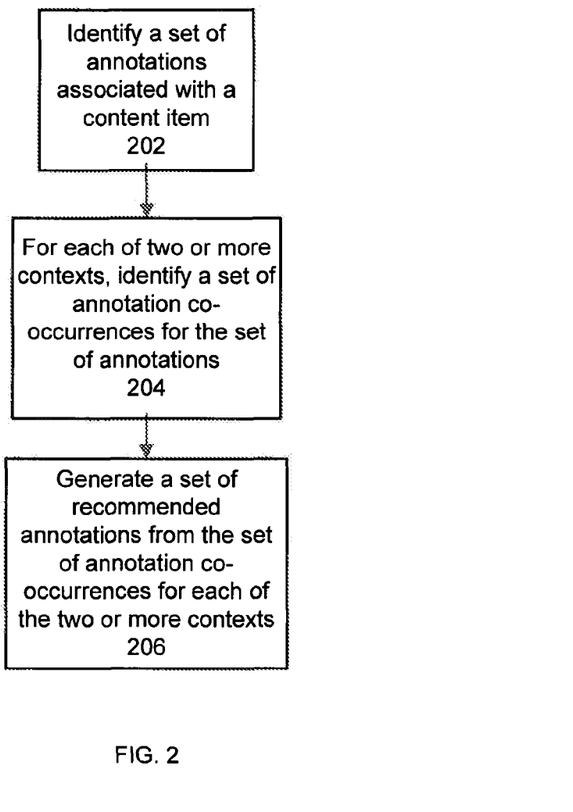
FIG. 2 is a process flow diagram illustrating an example method of generating a set of recommended annotations.

FIG. 2 is a process flow diagram illustrating an example method of generating a set of recommended annotations. An initial set of terms (e.g., annotations) may be identified. For instance, a set of annotations associated with a content item within a content sharing system may be identified at 202, where the content item is associated with a user of the content sharing system. For each of two or more contexts, a set of annotation co-occurrences for the set of annotations may be identified at 204. A single set of recommended annotations may then be generated from the set of annotation co-occurrences for each of the two or more contexts at 206. In this manner, a set of recommended annotations may be provided based upon an initial set of annotations.

In another embodiment, the initial set of terms may include terms of a query submitted to the content sharing system by a user of the content sharing system. Thus, for each of two or more contexts, a set of annotation co-occurrences for the set of terms may be identified. Each annotation co-occurrence in the set of annotation co-occurrences for a particular context may include one of the initial set of terms (e.g., query terms) and a co-occurring annotation (e.g., where both the term and the co-occurring annotation are used together to tag the same content item). A single set of recommended terms may then be generated from the set of annotation co-occurrences for each of the two or more contexts. The set of recommended terms may then be provided to the user submitting the query as suggested query terms.

The two or more contexts may include one or more personal contexts. In one embodiment, the two or more contexts may include a global context and at least one personal context. In another embodiment, the two or more contexts may include two or more personal contexts, but not include a global context. The identification of annotation co-occurrences as described at 204 will be described with reference to a global and personal context as shown in FIGS. 3A and 3B, respectively.

Figure 3A:
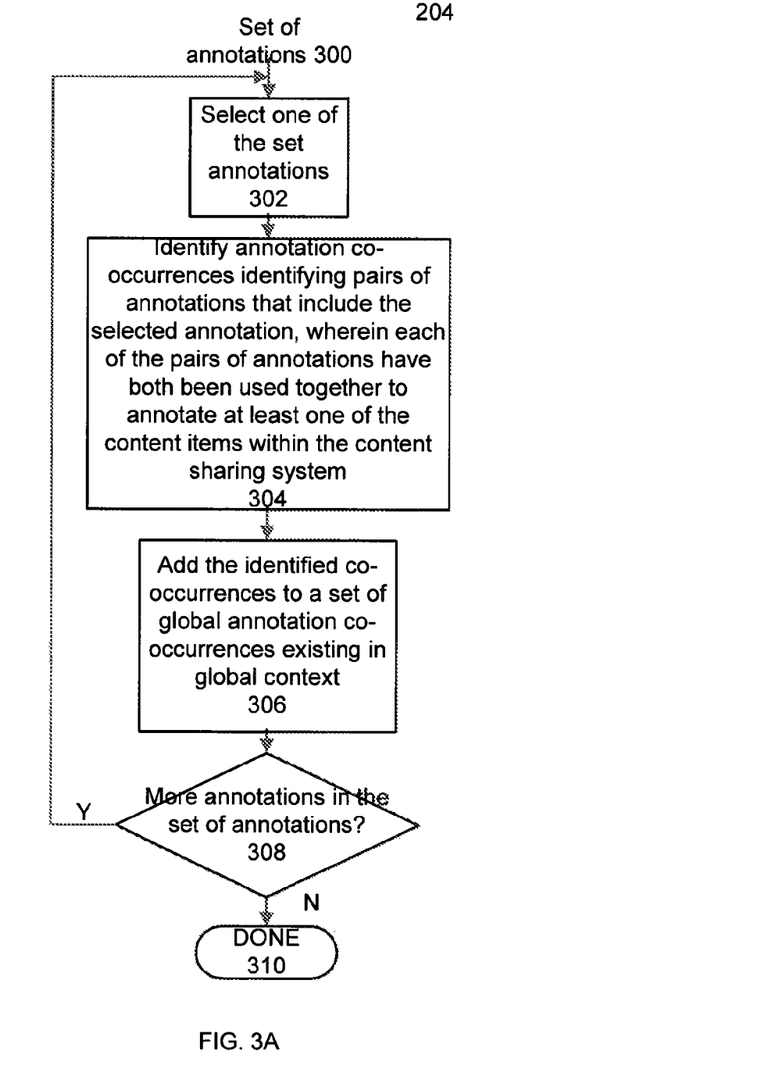
FIG. 3A is a process flow diagram illustrating an example method of identifying a set of annotation co-occurrences for the set of annotations within a global context as shown at 204 of FIG. 2.

FIG. 3A is a process flow diagram illustrating an example method of identifying a set of annotation co-occurrences for the set of annotations within a global context as shown at 204 of FIG. 2. Upon identifying a set of annotations 300, annotation co-occurrences in the global context may be identified for each annotation in the set of annotations. As shown in FIG. 3A, one of the set annotations may be selected at 302. Annotation co-occurrences identifying pairs of annotations that include the selected annotation may then be identified at 304, wherein each of the pairs of annotations have both been used together to annotate at least one of the content items within the content sharing system. For instance, the annotation co-occurrences may be identified over all content items within the content sharing system. The identified annotation co-occurrences, which may be referred to as an intermediate set of annotation co-occurrences, may be added to a set of global annotation co-occurrences existing in the global context at 306. If it is determined that there are more annotations in the set of annotations at 308, the process continues at 302. When annotation co-occurrences have been identified for all annotations in the set of annotations, the process ends at 310.

Figure 3B:
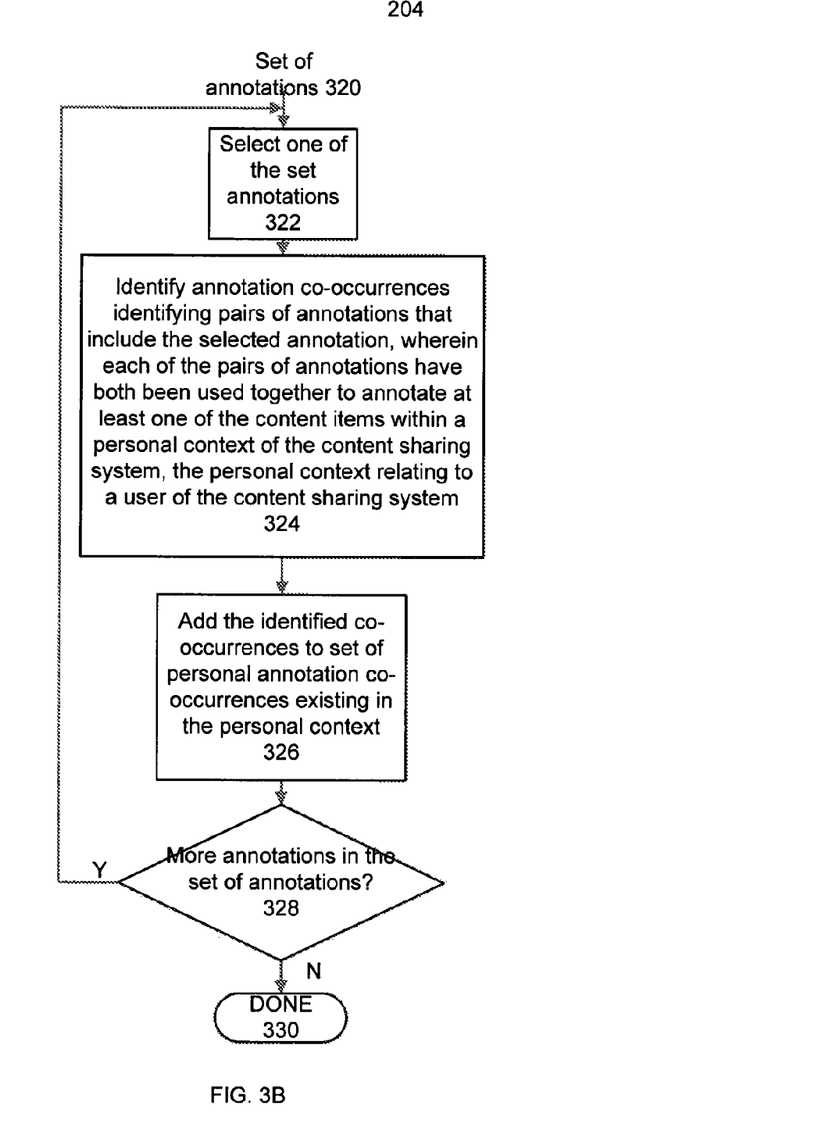
FIG. 3B is a process flow diagram illustrating an example method of generating a set of annotation co-occurrences for the set of annotations within a personal context as shown at 204 of FIG. 2.

FIG. 3B is a process flow diagram illustrating an example method of generating a set of annotation co-occurrences for the set of annotations within a personal context as shown at 204 of FIG. 2. Upon identifying a set of annotations 320, annotation co-occurrences in the personal context may be identified for each annotation in the set of annotations. As shown in FIG. 3B, one of the set annotations may be selected at 322. Annotation co-occurrences identifying pairs of annotations that include the selected annotation may then be identified at 324, wherein each of the pairs of annotations have both been used together to annotate at least one of the content items within the personal context. The identified annotation co-occurrences, which may be referred to as an intermediate set of annotation co-occurrences, may be added to a set of personal annotation co-occurrences existing in the personal context at 326. If it is determined that there are more annotations in the set of annotations at 328, the process continues at 322. When annotation co-occurrences have been identified for all annotations in the set of annotations, the process ends at 330.

Figure 3C:
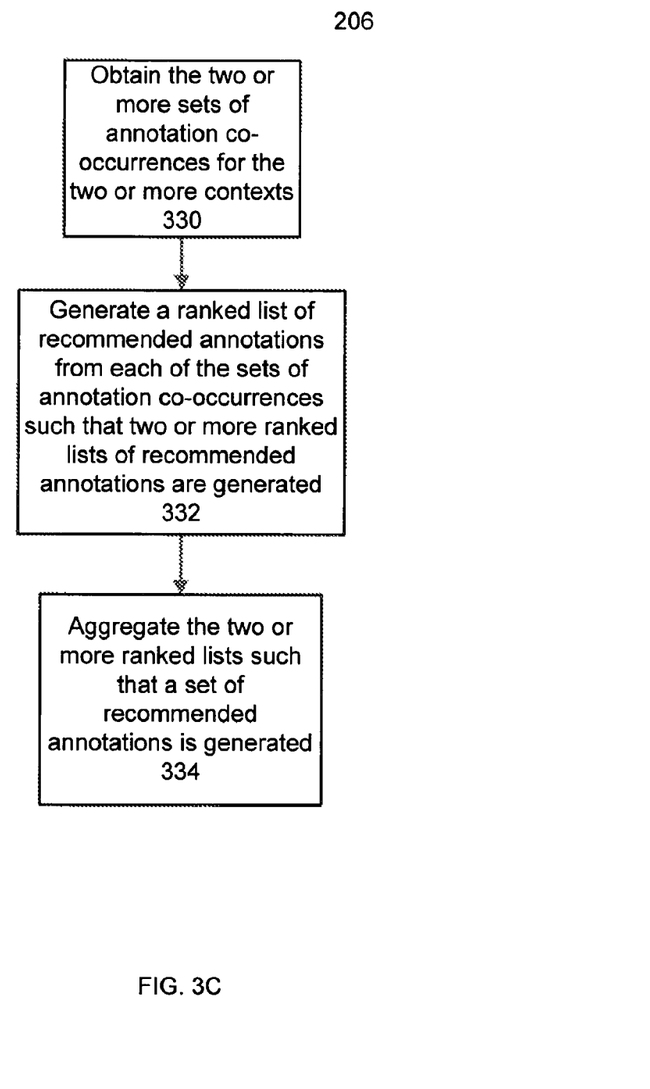
FIG. 3C is a process flow diagram illustrating an example method of aggregating two or more sets of recommended annotations.

FIG. 3C is a process flow diagram illustrating an example method of aggregating two or more sets of recommended annotations as shown at 206 of FIG. 2. Two or more sets of annotation co-occurrences for two or more contexts may be obtained at 330. A ranked list of recommended annotations may be generated from each of the sets of annotation co-occurrences such that two or more ranked lists of recommended annotation are generated at 332. The two or more ranked lists may then be aggregated such that a single set of recommended annotations is generated at 334.

Recommended annotations for a particular context may simply include those annotations that co-occur with any of the initial set of annotations within the context. Additional annotation data (e.g., statistical data) may be used to further rank the recommended annotations. At least a portion of the ranked annotations may then be merged with ranked annotations from one or more additional contexts by aggregating the different sets of ranked annotations.

Generating Recommended Annotations for a Context

In order to identify annotation co-occurrences and any corresponding statistical data, annotation data may be collected within a particular context. In one embodiment, a "network" of annotations may be derived for each context, where nodes represent the annotations themselves and edges represent a pair of annotations that have both been used to annotate the same content item. In addition to identifying the annotation co-occurrences, an occurrence count for annotations used within the context and a co-occurrence count for pairs of annotations used within the context may be calculated. The occurrence count $o(a_i)$ for an annotation indicates a number of times the annotation occurs in the context (e.g., network). Similarly, the co-occurrence count $c(a_i, a_j)$ for a pair of annotations indicates a number of times that the pair of annotations is used to annotate the same content item within the context (e.g., network). These counts may be continually updated when a media item and/or annotations are added, modified, or deleted. Alternatively, the counts may be calculated during the annotation recommendation process.

The probability of an annotation occurring in the context may be formulated as:

$$p(a_i) = \frac{o(a_i)}{\sum_{a \in A} o(a)} \quad (1)$$

The probability of two annotations co-occurring in the context may be formulated as:

$$p(a_i \mid a_j) = \frac{c(a_i, a_j)}{o(a_j)} \quad (2)$$

A complete set of annotation pairs co-occurring within a particular context (e.g., network) with respect to an initial set of annotations may be identified as described above with reference to FIGS. 3A and 3B. The annotations that may be recommended include each unique annotation that co-occurs with one of the initial set of annotations in the annotation pairs.

As set forth above with reference to FIGS. 3A and 3B, in order to produce a set of recommended annotations for a given set of initial annotations in a particular context, each of the set of initial annotations may be used to produce an intermediate set of suggested annotations s. These sets may then be combined.

The intermediate set of recommended annotations s for a given annotation in the initial set of annotations is the complete set of annotations that co-occur with the given annotation in the context (e.g., network) in which the annotation co-occurrences have been identified. In order to rank the unique co-occurring annotations for a particular context, the annotations may be "penalized" if they are not suggested by all of the annotations in the set of initial annotations (e.g., if they are not identified as a co-occurring tag with each of the set of initial annotations). In order to identify a set of recommended annotations given a set of initial annotations Q, the probability of a co-occurring annotation's intermediate suggestion given Q may be calculated for each annotation in each intermediate set of suggestions s as follows:

$$p(s \mid Q) = \prod_{q \in Q} \{p(s \mid q), \text{ if } p(s \mid q) > 0; \epsilon, \text{ otherwise}\} \quad (3)$$

where $\epsilon$ is the epsilon value set to a number significantly smaller than the lowest conditional probability in the complete set of all conditional probabilities. The epsilon value may be used to ensure that the corresponding tag is assigned a non-zero value, even if it is not co-occurring with each of the set of initial annotations.

Each resultant probability $p(s \in S \mid Q)$ may then be used to produce an ordered list or annotations in descending order of probability. The top N tags may then be the final set of recommended annotations as given by that context's network of annotations for a given initial set of annotations.

Through applying the above method, a ranked list of recommended annotations may be generated for a particular context (e.g., for the corresponding set of annotation co-occurrences). In this manner, a set of recommended annotations may be obtained for each of two or more contexts. These different sets of recommended annotations may then be aggregated such that a single ranked list of recommended annotations is generated.

When recommended annotations are to be provided, the conditional probabilities may be retrieved for each of the contexts. A separate list of ranked annotations may be generated for each of the contexts according to the probabilities. More specifically, each list of ranked annotations may be ordered to rank those with the highest conditional probability as those most likely to be recommended to the user. In order to combine the ranked lists, an aggregation method may be applied. Several example aggregation methods are described below.

Aggregation Methods

One method of aggregating two or more ranked sets of annotations includes the "Fall Back" method. Specifically, the two or more sets of ranked annotations may be ordered going from most user-specific to least user specific. For example, where a set of ranked annotations has been identified for each of the four different contexts described herein, the different ranked sets may be ordered in the following order: individual, social contacts, group, and global. For a given number of recommended annotations n, a new rank may be made up of a copy of the most personal rank available of length p and where it does not provide at least n suggestions, the first n-p highest scoring recommended annotations from the next most personal ranked set may be added onto the end of the new rank. This process may be repeated for each context until n annotations have been gathered.

Another method of aggregating two or more ranked sets of annotations includes the Borda Count. A group consensus function may be used to combine two or more ranked sets of annotations by assigning descending consecutive integer scores to each annotation of the individual ranked sets of annotations, and summing (or averaging) values to produce a new ordered ranked set of annotations. The Borda Count method treats each ranked set of annotations the same. This method also emphasizes those annotations that are common to more than one ranked set of annotations, and may also penalize annotations that were only produced by a single ranked set of annotations. More specifically, linear scoring may be used to assign an integer "score" to each annotation of a particular ranked set of annotations. In addition, the first element of each ranked set of annotations may be given the same value as the first element of other ranked sets of annotations. For instance, the value of the first element of each of the ranked sets of annotations may be greater than or equal to the maximum length of the individual ranked sets of annotations. In accordance with a modified Borda Count method, the starting score for the first annotation of each ranked set of annotations may be equal to the length of that rank.

Another method of aggregating two or more ranked sets of annotations includes a Linear Combination of Confidence Values. Annotation probability values for a given set of initial annotations may be summed. More specifically, the probability values obtained for each unique annotation may be summed over all of the ranked sets of annotations. For instance, two different probability values for a particular annotation may be obtained in association with two different contexts. These two probability values may be summed to generate a single probability value. The resulting probability values summed over two or more contexts may then be used to rank the annotations.

Another method of aggregating two or more ranked sets of annotations is through the use of a machine learned approach. One such approach is a Support Vector Machine. For instance, the different ranked sets of annotations and set of initial annotations may be input to a Support Vector Machine implementation. A ranking classifier may be trained using a training set, which includes example ranked sets of annotations. The training examples may be defined by various features. For instance, a first group of features may include the independent probability of the input annotations and recommended annotations separately occurring in the personal and general contexts. A second group of features may include the conditional probability of each input annotation co-occurring with each recommended annotation for each context. A third group of features may include the probabilities of an input/recommended annotation occurring divided by the conditional probability of an input/recommended annotation given another input/recommended annotation. A fourth group of features may include user-specific statistics including the number of contacts the user has, the number of groups the user affiliates themselves with, the number of content items they have submitted to the content sharing system, and/or the dictionary size of their individual context of annotations.

From the training examples, the Support Vector Machine may compute feature vectors according to the various features. These feature vectors may define weights that correspond to the various features. These feature vectors may then be applied to two or more ranked lists of annotations to enable a single ranked list of annotations to be generated.

The Support Vector Machine and classifier may be trained using input associated with a particular user. In this manner, the Support Vector Machine may be biased according to that user's past interactions. In this manner, annotations may be recommended that are most likely to be relevant to the user.

Various weights and weighting functions may be used. The weights may be configured during training, and may also be re-adjusted according to the preference of a system operator.

The above-described example illustrates the use of a Support Vector Machine. However, other machine learned approaches, such as a Cost Sensitive Multi Layered Perceptron approach may also be used.

User Interface

Figure 4:
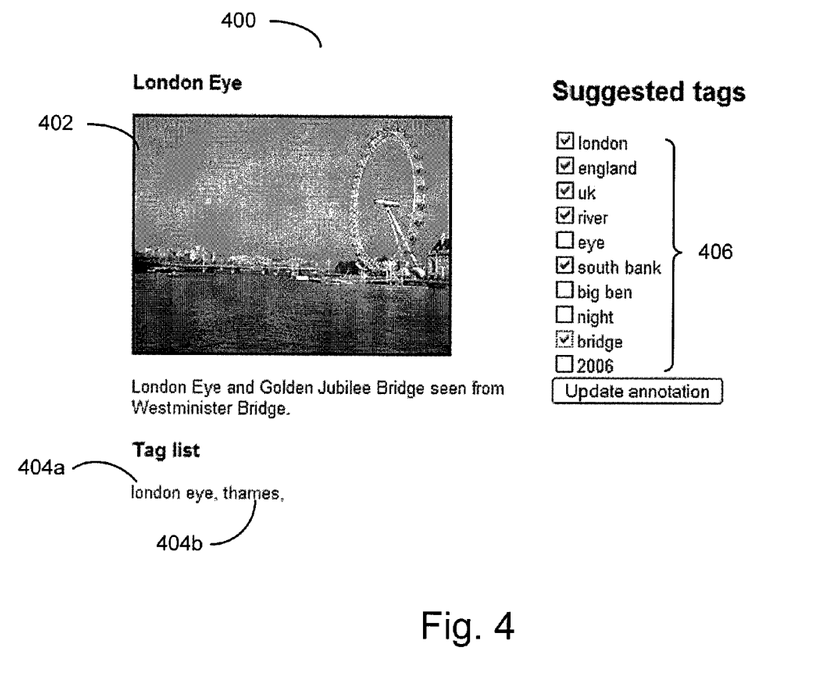
FIG. 4 is a screen shot illustrating an example graphical user interface for providing recommended annotations based upon an initial set of annotations.

FIG. 4 is a screen shot illustrating an example graphical user interface for providing recommended annotations based upon an initial set of annotations (e.g., associated with a particular content item). As shown in FIG. 4, a user may interact with a graphical user interface depicting the user-submitted content item 402, annotations 404a, 404b (which may have been previously submitted by the user), and a plurality of recommended annotations 406 retrieved as previously set forth.

A user may upload the content item 402 and manually assign one or more annotations 404a and 404b that he or she believes adequately describe the content item 402. In one embodiment, the user submits the content item 402 and the annotations 404a, 404b, and the graphical user interface presents the list of suggested annotations 406. In another embodiment, suggested annotations 406 may be retrieved asynchronously without explicit user submission (e.g., wherein the content item 402 and/or annotations 404a, 404b have previously been submitted).

Annotation data used to automatically generate recommended annotations may be stored so that the annotation data need not be re-generated for each user. As set forth above, the annotation data may be stored in a co-occurrence database. The co-occurrence database may be updated during the automatic annotation generation process (e.g., when annotations are generated and provided). Alternatively, the co-occurrence database may be updated when an annotation is added to a content item, modified, or deleted (e.g., in response to user input). The co-occurrence database may include annotation data for one or more different contexts (e.g., personal and/or global contexts). The annotation data for a particular context may include: 1) identification of annotation pairs (e.g., Paris, Eiffel Tower) occurring in the context, 2) co-occurrence counts for each of the annotation pairs indicating the number of times each of the annotation pairs co-occurs in the context, 3) identification of annotations occurring in the context, and/or 4) occurrence counts for each of the annotations indicating the number of times each of the annotations occurs in the context.

Collection of Annotation Data

Figure 5:
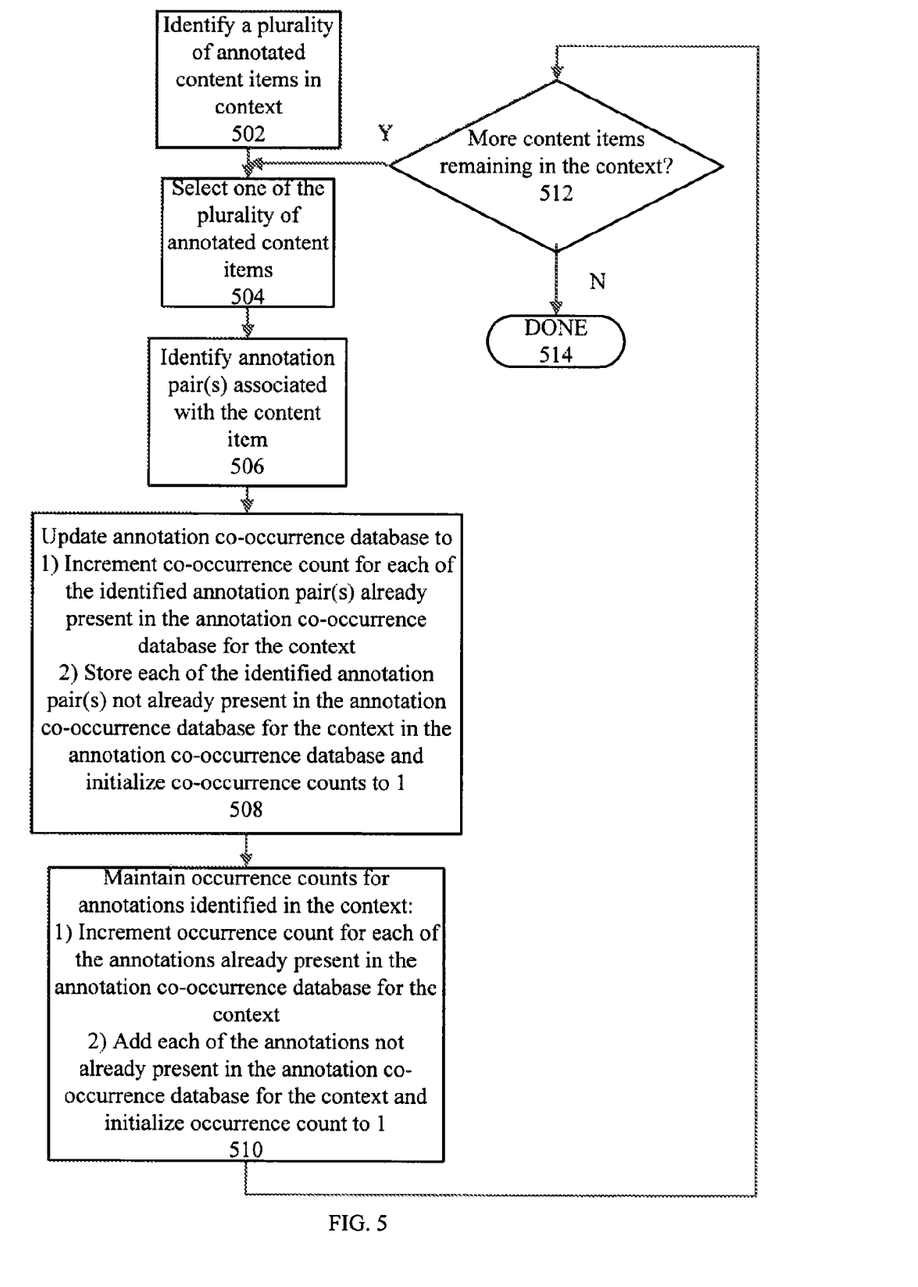
FIG. 5 is a process flow diagram illustrating an example method of updating a co-occurrence database.

FIG. 5 is a process flow diagram illustrating an example method of updating a co-occurrence database for a particular context. A plurality of annotated content items in a context may be identified at 502. More particularly, content items that do not have associated annotations need not be identified. One of the plurality of annotated content items may be selected at 504. One or more annotation pair(s) associated with the selected annotated content item may then be identified at 506. The annotation co-occurrence database may then be updated at 508 to 1) increment a co-occurrence count for each of the identified annotation pair(s) already present in the annotation co-occurrence database for the context and 2) store each of the identified annotation pair(s) not already present in the annotation co-occurrence database for the context in the annotation co-occurrence database and initialize the corresponding co-occurrence counts to 1. In addition, occurrence counts for annotations identified in the content item may also be updated at 510 to 1) increment an occurrence count for each of the annotations already present in the annotation co-occurrence database for the context and 2) store each of the annotations not already present in the annotation co-occurrence database for the context and initialize the corresponding occurrence counts to 1. If more annotated content items in the plurality of annotated content items remain in the context at 512, the process continues at 504. When each of the plurality of annotated content items in the context have been processed, the process is complete as shown at 514. The process may be repeated for each context to be considered during the annotation recommendation process.

System Configuration

Figure 6:
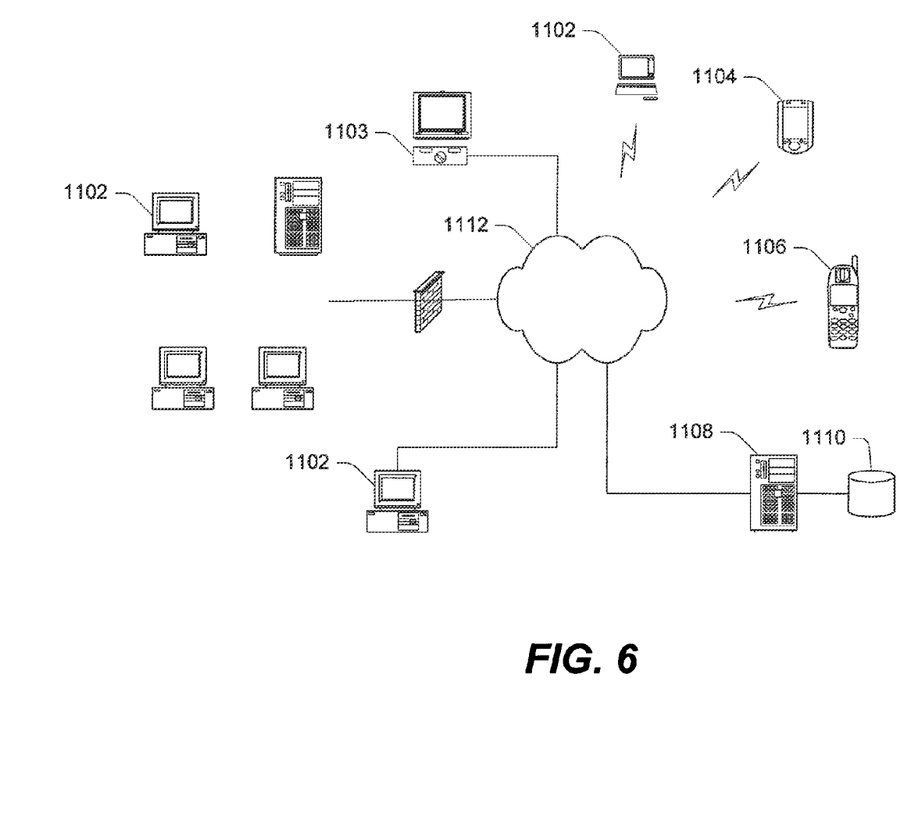
FIG. 6 is a simplified diagram of a network environment in which various embodiments may be implemented.

The disclosed embodiments may be employed to automatically generate and provide recommended annotations to various users in any of a wide variety of computing contexts. For example, as illustrated in FIG. 6, implementations are contemplated in which users interact with a diverse network environment via any type of computer (e.g., desktop, laptop, tablet, etc.) 1802, media computing platforms 1803 (e.g., cable and satellite set top boxes and digital video recorders), handheld computing devices (e.g., PDAs) 1804, cell phones 1806, or any other type of computing or communication platform.

And according to various embodiments, input that is processed in accordance with the invention may be obtained using a wide variety of techniques. For example, user input such as the selection of a recommended annotation may be obtained from a user's interaction with a local application, web site or web-based application or service and may be accomplished using any of a variety of well known mechanisms for obtaining information from a user. However, it should be understood that such methods of obtaining input from a user are merely examples and that a search query may be obtained in many other ways.

Annotation data may be collected and/or processed to generate and provide recommended annotations in accordance with the disclosed embodiments in some centralized manner. This is represented in FIG. 6 by server 1808 and data store 1810 which, as will be understood, may correspond to multiple distributed devices and data stores. The invention may also be practiced in a wide variety of network environments (represented by network 1812) including, for example, TCP/IP-based networks, telecommunications networks, wireless networks, etc. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The disclosed techniques of the present invention may be implemented in any suitable combination of software and/or hardware system, such as a web-based server or desktop computer system. The annotation recommendation apparatus and/or web browser of this invention may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the required method steps.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store annotation data, content items and corresponding annotations, user data, social contacts and groups associated with users, statistical models and information generated from those statistical models (e.g., probabilities associated with co-occurring annotations in association with various contexts), etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 7:
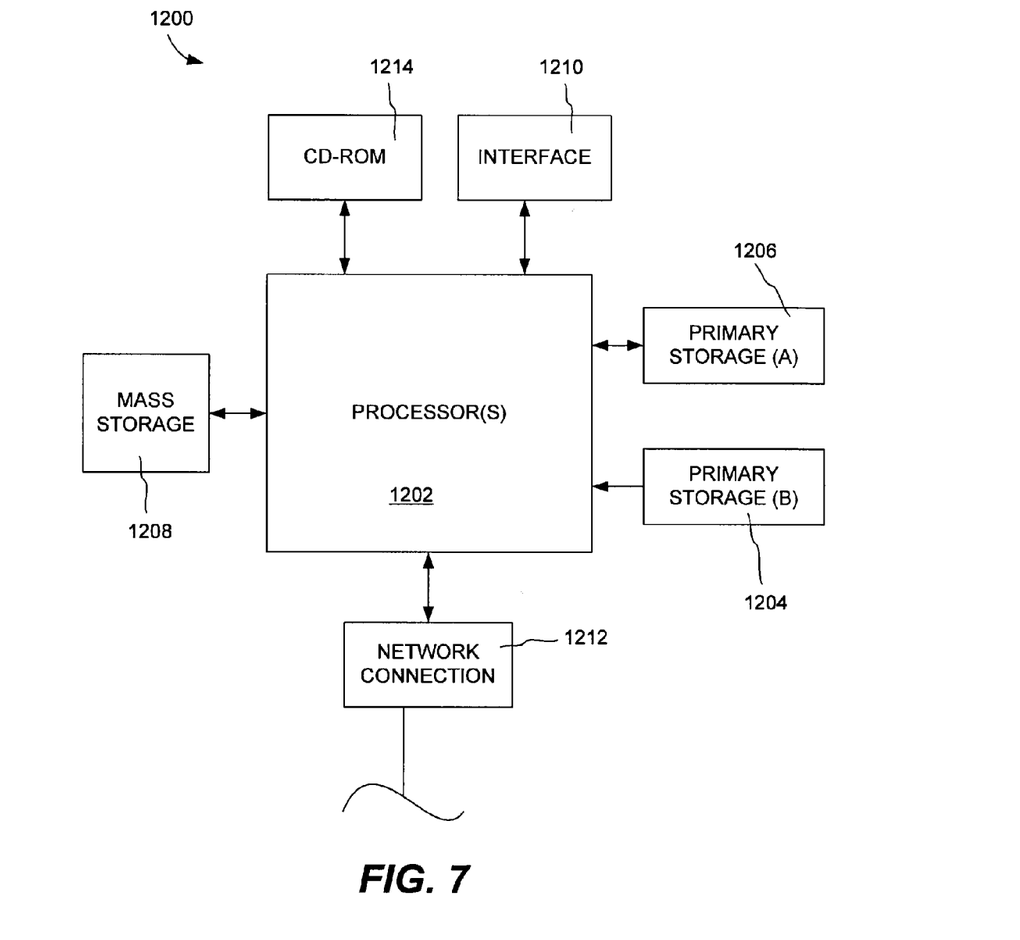
FIG. 7 illustrates an example computer system in which various embodiments may be implemented.

FIG. 7 illustrates a typical computer system that, when appropriately configured or designed, can serve as a system of this invention. The computer system 1900 includes any number of processors 1902 (also referred to as central processing units, or CPUs) that are coupled to storage devices including primary storage 1906 (typically a random access memory, or RAM), primary storage 1904 (typically a read only memory, or ROM). CPU 1902 may be of various types including microcontrollers and microprocessors such as programmable devices (e.g., CPLDs and FPGAs) and unprogrammable devices such as gate array ASICs or general purpose microprocessors. As is well known in the art, primary storage 1904 acts to transfer data and instructions uni-directionally to the CPU and primary storage 1906 is used typically to transfer data and instructions in a bi-directional manner. Both of these primary storage devices may include any suitable computer-readable media such as those described above. A mass storage device 1908 is also coupled bi-directionally to CPU 1902 and provides additional data storage capacity and may include any of the computer-readable media described above. Mass storage device 1908 may be used to store programs, data and the like and is typically a secondary storage medium such as a hard disk. It will be appreciated that the information retained within the mass storage device 1908, may, in appropriate cases, be incorporated in standard fashion as part of primary storage 1906 as virtual memory. A specific mass storage device such as a CD-ROM 1914 may also pass data uni-directionally to the CPU.

CPU 1902 may also be coupled to an interface 1910 that connects to one or more input/output devices such as such as video monitors, printers, track balls, mice, keyboards, microphones, displays such as touch-sensitive displays, transducer card readers, magnetic or paper tape readers, tablets, styluses, voice or handwriting recognizers, or other well-known input devices such as, of course, other computers. Finally, CPU 1902 optionally may be coupled to an external device such as a database, or a computer or telecommunications network using an external connection as shown generally at 1912. With such a connection, it is contemplated that the CPU might receive information from the network, or might output information to the network in the course of performing the method steps described herein.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method, comprising:
   identifying a set of tags associated with one of a plurality of content items within a content sharing system, the content item being associated with a user of the content sharing system;
   identifying a set of global tag co-occurrences within the content sharing system for the set of tags, each of the global tag co-occurrences in the set of global tag co-occurrences identifying a pair of tags including one of the set of tags, wherein the pair of tags have both been used together to tag at least one of the plurality of content items within the content sharing system; and
   identifying one or more sets of personal tag co-occurrences for the set of tags, each of the sets of personal tag co-occurrences being used in a corresponding one of one or more personal contexts of the content sharing system, the one or more personal contexts relating to the user of the content sharing system, each of the personal tag co-occurrences in the sets of personal tag co-occurrences identifying a pair of tags including one of the set of tags that have both been used together to tag at least one content item within a corresponding one of the one or more personal contexts; and
   generating a set of recommended tags from the set of global tag co-occurrences and the one or more sets of personal tag co-occurrences, wherein generating a set of recommended tags includes generating a list of recommended tags from the set of global tag co-occurrences, generating a list of recommended tags from each of the sets of personal tag co-occurrences, and aggregating the list of recommended tags for the set of global tag co-occurrences and the list of recommended tags for each of the sets of personal tag co-occurrences such that the set of recommended tags is generated.

2. The method as recited in claim 1, further comprising:
   for each of the global tag co-occurrences in the set of global tag co-occurrences, ascertaining a frequency of the pair of tags co-occurring in the content sharing system; and
   for each of the personal tag co-occurrences in the sets of personal tag co-occurrences, ascertaining a frequency of the pair of tags co-occurring in the corresponding one of the personal contexts; and
   wherein generating the set of recommended tags from the set of global tag co-occurrences and the one or more sets of personal tag co-occurrences is performed using the frequency of each corresponding pair of tags co-occurring.

3. The method as recited in claim 1, further comprising:
   ascertaining a co-occurrence count for each of the global tag co-occurrences in the set of global tag co-occurrences, the co-occurrence count indicating a number of times that the pair of tags occur together within the content sharing system;
   calculating a conditional probability of two tags co-occurring for each pair of tags in the set of global tag co-occurrences; and identifying one or more recommended tags using the conditional probability for each pair of tags in the set of global tag co-occurrences.

4. The method as recited in claim 1, further comprising:
for each of the sets of personal tag co-occurrences and corresponding personal contexts,
ascertaining a co-occurrence count for each of the personal tag co-occurrences in the set of personal tag co-occurrences, the co-occurrence count indicating a number of times that the pair of tags occur together within the corresponding one of the personal contexts;
calculating a conditional probability of two tags co-occurring for each pair of tags in the set of personal tag co-occurrences; and
identifying one or more recommended tags using the conditional probability for each pair of tags in the set of personal tag co-occurrences.

5. The method as recited in claim 1, wherein the set of global tag co-occurrences represents tag co-occurrences over the plurality of content items of the content sharing system.

6. The method as recited in claim 1, wherein the one or more personal contexts comprise an individual context, wherein each of the set of personal tag co-occurrences in the individual context identifies a pair of tags that have been used together to tag at least one content item of the user.

7. The method as recited in claim 6, wherein the one or more personal contexts further comprises a social contacts context, wherein each of the set of personal tag co-occurrences in the social contacts context identifies a pair of tags that have been used together to tag at least one content item by one of a set of users, each of the set of users being a contact of the user.

8. The method as recited in claim 7, wherein the one or more personal contexts further comprises a group context, wherein each of the set of personal tag co-occurrences in the group context identifies a pair of tags that have been used together to tag at least one content item associated with at least one group of which the user is a member.

9. The method as recited in claim 6, wherein the one or more personal contexts further comprises a group context, wherein each of the set of personal tag co-occurrences in the group context identifies a pair of tags that have been used together to tag at least one content item associated with at least one group of which the user is a member.

10. The method as recited in claim 1, wherein the one or more personal contexts comprises a social contacts context, wherein each of the set of personal tag co-occurrences in the social contacts context identifies a pair of tags that have been used together to tag at least one content item by one of a set of users, each of the set of users being a contact of the user.

11. The method as recited in claim 10, wherein the one or more personal contexts comprises a group context, wherein each of the set of personal tag co-occurrences in the group context identifies a pair of tags that have been used together to tag at least one content item associated with at least one group of which the user is a member.

12. The method as recited in claim 1, wherein the one or more personal contexts comprises a group context, wherein each of the set of personal tag co-occurrences in the group context identifies a pair of tags that have been used together to tag at least one content item associated with at least one group of which the user is a member.

13. The method as recited in claim 1, further comprising:
providing the set of recommended tags via a graphical user interface.

14. The method as recited in claim 1, further comprising:
automatically associating at least one of the set of recommended tags with the content item.

15. The method as recited in claim 1, wherein aggregating is performed using a Borda count method that prioritizes tags that are in a greater number of lists than tags that are in a smaller number of lists.

16. The method as recited in claim 1, wherein aggregating is performed using a Support Vector Machine.

17. The method as recited in claim 1, wherein aggregating is performed by applying a Fall Back method in which the list of recommended tags for the set of global tag co-occurrences and the list of recommended tags for each of the sets of personal tag co-occurrences are ordered from most user specific to least user specific.

18. The method as recited in claim 1, wherein generating a list of recommended tags for the set of global tag co-occurrences is performed using an occurrence count for tags used in the content sharing system and a co-occurrence count for the tag co-occurrences in the content sharing system.

19. The method as recited in claim 1, wherein generating a list of recommended tags for each of the sets of personal tag co-occurrences and corresponding personal contexts is performed using an occurrence count for tags in the corresponding one of the personal contexts and a co-occurrence count for the tag co-occurrences in the corresponding one of the personal contexts.

20. An apparatus, comprising:
a processor; and
a memory, at least one of the processor or the memory being adapted for:
identifying a set of tags associated with one of a plurality of content items within a content sharing system, the content item being associated with a user of the content sharing system;
for each one of the set of tags, identifying one or more global tag co-occurrences within the content sharing system, each of the global tag co-occurrences identifying a pair of tags including the one of the set of tags, wherein the pair of tags have both been used together to tag at least one of the plurality of content items within the content sharing system, thereby identifying a set of global tag co-occurrences for the set of tags;
for each of one or more personal contexts of the content sharing system, identifying one or more personal tag co-occurrences used in the one of the one or more personal contexts of the content sharing system for each one of the set of tags, the one or more personal contexts relating to the user of the content sharing system, each of the personal tag co-occurrences identifying a pair of tags including the one of the set of tags that have both been used together to tag at least one content item within the corresponding one of the one or more personal contexts, thereby generating a set of personal tag co-occurrences for each of the personal contexts for the set of tags;
generating a first set of recommended tags from the set of global tag co-occurrences;
generating one or more additional sets of recommended tags from each of the one or more sets of personal tag co-occurrences; and
generating a list of recommended tags from the first set of recommended tags and the one or more additional sets of recommended tags.

21. A method, comprising:
- identifying a set of tags associated with one of a plurality of content items within a content sharing system, the content item being associated with a user of the content sharing system;
- for each of two or more personal contexts of the content sharing system, identifying one or more personal tag co-occurrences used in the one of the two or more personal contexts of the content sharing system for each one of the set of tags, the two or more personal contexts relating to the user of the content sharing system, each of the personal tag co-occurrences identifying a pair of tags including one of the set of tags that have both been used together to tag at least one content item within the corresponding one of the two or more personal contexts, thereby generating a set of personal tag co-occurrences for each of the two or more personal contexts such that two or more sets of personal tag co-occurrences are generated; and
- generating a set of recommended tags from the two or more sets of personal tag co-occurrences for each pair of tags in the two or more sets of personal tag co-occurrences, wherein generating a set of recommended tags includes generating two or more sets of recommended tags from the two or more sets of personal tag co-occurrences and generating the set of recommended tags from the two or more sets of recommended tags.

22. The method as recited in claim 21, wherein the two or more personal contexts comprises a group context, wherein each of the set of personal tag co-occurrences in the group context identifies a pair of tags that have been used together to tag at least one content item associated with at least one group of which the user is a member.

23. The method as recited in claim 21, wherein the two or more personal contexts comprises a social contacts context, wherein each of the set of personal tag co-occurrences in the social contacts context identifies a pair of tags that have been used together to tag at least one content item by one of a set of users, each of the set of users being a contact of the user.

24. A non-transitory computer-readable medium storing thereon computer-readable instructions, comprising:
- instructions for identifying a set of tags associated with one of a plurality of content items within a content sharing system, the content item being associated with a user of the content sharing system;
- instructions for identifying a set of global tag co-occurrences for the plurality of content items within the content sharing system, each of the global tag co-occurrences in the set of global tag co-occurrences identifying a pair of tags that have both been used together to tag at least one of the plurality of content items within the content sharing system, each of the pair of tags in the set of global tag co-occurrences including one of the set of tags;
- instructions for identifying one or more sets of personal tag co-occurrences, each of the sets of personal tag co-occurrences being used in a corresponding one of one or more personal contexts of the content sharing system, the one or more personal contexts relating to the user of the content sharing system, each of the personal tag co-occurrences in the sets of personal tag co-occurrences identifying a pair of tags that have both been used together to tag at least one content item within a corresponding one of the one or more personal contexts, each of the pair of tags in the one or more sets of personal tag co-occurrences including one of the set of tags; and
- instructions for generating a set of recommended tags from the set of global tag co-occurrences and the one or more sets of personal tag co-occurrences, wherein generating the set of recommended tags includes generating a list of recommended tags from the set of global tag co-occurrences, generating a list of recommended tags from each of the sets of personal tag co-occurrences, and generating the set of recommended tags from the list of recommended tags for the set of global tag co-occurrences and the list of recommended tags for each of the sets of personal tag co-occurrences.

25. An apparatus comprising:
- a processor; and
- a memory, at least one of the processor or the memory being adapted for:
- identifying a set of terms within a content sharing system, wherein the set of terms are associated with a user of the content sharing system, the content sharing system including a plurality of content items;
- for each of two or more contexts within the content sharing system, identifying a set of tag co-occurrences within the content sharing system for the set of terms, each of the set of tag co-occurrences identifying a pair of tags including one of the set of terms, wherein the pair of tags have both been used together to tag at least one of the plurality of content items within the corresponding one of the two or more contexts within the content sharing system, at least one of the two or more contexts being a personal context relating to the user of the content sharing system; and
- generating a set of recommended tags from the set of tag co-occurrences identified for each of the two or more contexts, wherein generating the set of recommended tags includes generating a first list of recommended tags from the set of tag co-occurrences for a first one of the two or more contexts, generating a second list of recommended tags from the set of tag co-occurrences for a second one of the two or more contexts, and generating the set of recommended tags from the first list of recommended tags and the second list of recommended tags.

26. The apparatus as recited in claim 25, at least one of the processor or the memory being adapted for performing steps, further comprising:
- receiving a query from the user, the query including the set of terms; and
- providing the set of recommended terms as suggested query terms.

* * * * *